(12) United States Patent
Carter et al.

(10) Patent No.: US 10,711,649 B2
(45) Date of Patent: Jul. 14, 2020

(54) COMPRESSOR CASING REPAIR ASSEMBLY AND METHOD

(71) Applicant: Mitsubishi Hitachi Power Systems Americas, Inc., Lake Mary, FL (US)

(72) Inventors: Chet Carter, Savannah, GA (US); Noah Rowe, Orlando, FL (US)

(73) Assignee: Mitsubishi Hitachi Power Systems Americas, Inc., Lake Mary, FL (US)

( * ) Notice: Subject to any disclaimer, the term of this patent is extended or adjusted under 35 U.S.C. 154(b) by 82 days.

(21) Appl. No.: 15/994,254

(22) Filed: May 31, 2018

(65) Prior Publication Data

US 2019/0368382 A1    Dec. 5, 2019

(51) Int. Cl.
*F01D 25/28* (2006.01)
*F01D 25/24* (2006.01)
*F02C 3/04* (2006.01)

(52) U.S. Cl.
CPC ........... *F01D 25/285* (2013.01); *F01D 25/24* (2013.01); *F02C 3/04* (2013.01); *F05D 2220/32* (2013.01)

(58) Field of Classification Search
CPC ...... F01D 25/285; F01D 25/24; F01D 25/246; F02C 3/04; F05D 2230/14; F05D 2230/80; F05D 2220/32; B23Q 9/0014; B24B 27/0084; B24B 23/08; B24B 5/307
See application file for complete search history.

(56) References Cited

U.S. PATENT DOCUMENTS

| | | |
|---|---|---|
| 5,189,933 A | 3/1993 | Ricci |
| 6,540,455 B1 | 4/2003 | Speranza |
| 7,029,371 B1 | 4/2006 | Bird |
| 8,074,866 B2 | 12/2011 | Bird |
| 2004/0175247 A1 | 9/2004 | VanderPol et al. |

*Primary Examiner* — Moshe Wilensky
(74) *Attorney, Agent, or Firm* — Schwegman Lundberg & Woessner, P.A.

(57) ABSTRACT

According to one example, an assembly for a repair of a compressor casing of a gas turbine engine is disclosed. The assembly can comprise: an arcuate track configured to be mounted to the casing, wherein when mounted to the casing the track is configured to be spaced in a substantially concentric arrangement from an inner surface of the casing; a carrier coupled to the track and movable therealong; and a machining device mounted to the carrier, the carrier configured to adjust at least an axial position of the machining device relative to the track for machining the inner surface of the casing.

21 Claims, 7 Drawing Sheets

COMPRESSOR CASING REPAIR ASSEMBLY AND METHOD

TECHNICAL FIELD

The present application pertains generally, but not by way of limitation, to gas turbine engines. More particularly, the present application is directed to, but not by way of limitation, methods and devices for repairing compressor casings in a gas turbine engine.

BACKGROUND

Gas turbine engines operate by passing a volume of gases through a series of compressors and turbines in order to produce rotational shaft power. High energy gases rotate a turbine to generate the shaft power. The shaft power drives a compressor to provide compressed air to a combustion process that generates the high energy gases for turning the turbine. In an aircraft engine, the turbine can be used to generate propulsion, such as directly via thrust, or indirectly via a shaft and fan or propeller. In an industrial gas turbine, the shaft power can drive a generator that produces electricity. Alternatively, a power turbine can be used to drive a shaft for powering the generator.

Each compressor and turbine includes a plurality of stages of stator vanes (also known as nozzles or stators) and rotor blades (also known as buckets), each vane and blade including an airfoil. In general, vanes redirect the trajectory of gases coming off the blades for flow into the next stage. In the compressor, vanes convert kinetic energy of moving gases into pressure, while, in the turbine, vanes accelerate pressurized gases to extract kinetic energy. In the compressor, the rotating blades push gases past the stationary vanes. In the turbine, the rotating blades extract rotational power from flowing gases.

In the compressor, the vanes are held in place along their base platforms by features of the compressor casing termed "hook fits". Movement of gases against and across the vanes can cause some small movement of the vanes and their base platforms relative to the hook fits. Over time, this can wear the hook fits, necessitating a repair to achieve desired specifications and tolerances.

Several methods and apparatuses for repair of the hook fits have been utilized, including machining methods using handheld tools. However, such methods and apparatuses are subject to inefficiencies resulting from a lack of ergonomic design, a high degree of training required for personnel, a high degree of variability, cumbersomeness of the apparatuses utilized and a time-consuming setup process.

OVERVIEW

The present inventors have recognized, among other things, that efficiency and repeatability of the repair of hook fits in achieving desired tolerances and specifications could be improved. The subject matter of the present disclosure can help achieve improved efficiency, repeatability and can address some of the other drawbacks of the apparatuses and methods utilized previously. For example, the present disclosure provides for an assembly for a repair of a compressor casing of a gas turbine engine. The assembly can include an arcuate track configured to be mounted to the casing. The track can be shaped to be spaced in a substantially concentric arrangement from an inner surface of the casing when mounted to the casing. A carrier can be coupled to the track and can be moveable along the track. The carrier can carry a machining device and can be configured to adjust at least one of a position and an angle of the machining device relative to the track for machining the inner surface of the casing.

The assembly (and methods disclosed herein) provide for repair of the hook fits in a quicker and more efficient manner as compared to known apparatuses and methods while meeting tolerance and specification criteria in a more repeatable manner. For example, the assembly can provide for a quicker and easier setup when compared to known apparatuses and methods. Additionally, the assembly can allow for repair of the hook fits even with the rotor remaining installed within the casing, which may not be possible in some cases with the known apparatuses and methods.

In another example, an assembly for a repair of a compressor casing of a gas turbine engine is disclosed that can include an arcuate backplate, an arcuate track, a carrier and a machining device. The backplate can be configured to be mounted to the casing by a plurality of mounts. The track can have at least a first section that is moveably connected to the backplate to shift a radius of the first section to substantially correspond with a radius of an inner surface of the casing. The carrier can be coupled to the track and movable therealong. The machining device can be mounted to the carrier and the carrier can be configured to adjust at least one of a position and an angle of the machining device relative to the track for machining the inner surface of the casing.

In yet another example, a method for repairing a compressor casing of a gas turbine engine is disclosed. The method can include positioning an arcuate track within the casing such that the track is spaced in a substantially concentric arrangement from an inner surface of the casing, machining the inner surface of the casing along a first path by moving a carrier along the track with a machining device positioned in at least one of a first position and a first angle relative to the track, adjusting the machining device from the at least one of the first position and the first angle to at least one of a second position and a second angle relative to the track and machining the inner surface of the casing along a second path by moving the carrier along the track with the machining device positioned in the at least one of the second position and the second angle.

This overview is intended to provide an overview of subject matter of the present patent application. It is not intended to provide an exclusive or exhaustive explanation of the inventive subject matter. The detailed description is included to provide further information about the present patent application.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
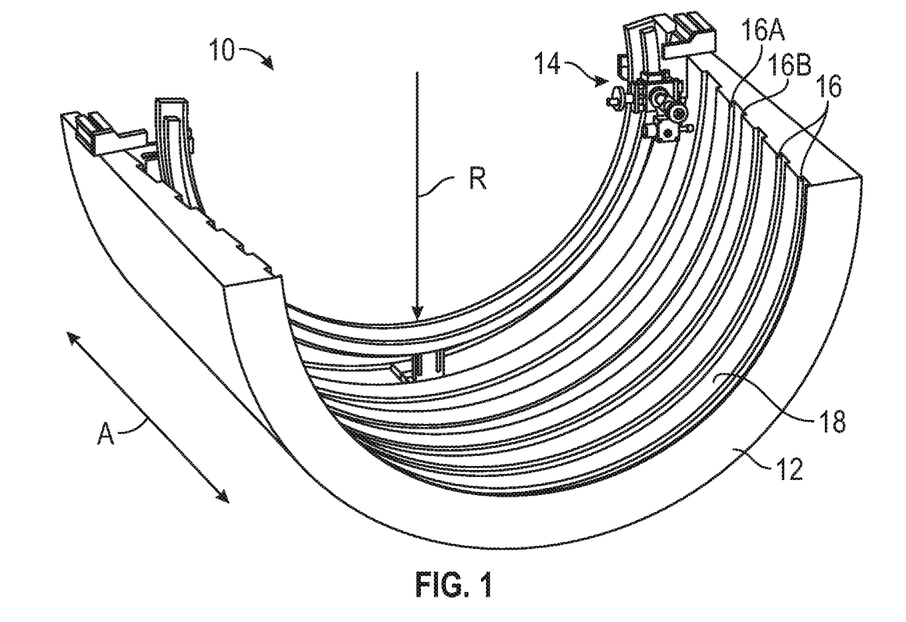
FIG. 1 is a perspective view of a compressor casing including a plurality of hook fits and an assembly configured to repair the hook fits mounted in the casing according to an example of the present disclosure.

FIG. 1 is a perspective view of a portion of a gas turbine engine 10 comprising a half of a compressor casing 12. FIG. 1 additionally shows an assembly 14 mounted to the compressor casing 12. In brief, the assembly 14 can be configured for the repair of the compressor casing 12, in particular, by machining (e.g., grinding) one or more of a plurality of hook fits 16. The plurality of hook fits 16 extend circumferentially along and can comprise features of an inner surface 18 of the compressor casing 12. The inner surface 18 of the compressor casing 12 has a radius R of curvature. The radius R of curvature can change according to the axial location within the compressor casing 12.

The plurality of hook fits 16 can be spaced apart from one another in an axial direction A. More particularly, the hook fits 16 can be arranged in pairs (e.g., 16A and 16B) which oppose one another in the axial direction A. Thus, the pairs (e.g., 16A and 16B face one another in the axial direction A and are positioned in a predefined relationship relative to one another. As will be discussed and shown subsequently, the pairs (e.g., 16A and 16B) are arranged according to a stage of the compressor defined by the compressor casing 12.

In the embodiment of FIG. 1, parts of the gas turbine engine 10 are removed for ease of reference and to provide further detail of the assembly 10 and the compressor casing 12. Thus, various sections and components of the gas turbine engine 10 are not explicitly shown in FIG. 1. These components include a rotor (referred to below as high and low pressure rotor shafts) that can be positioned within the compressor casing 12 and can move relative to the compressor casing 12 and other components, which remain stator.

Thus, the gas turbine engine can include a gas generator connected to a power generator via power turbine. The gas generator can comprise, in series order from front to rear, a low pressure compressor section, a high pressure compressor section, a combustor section, a high pressure turbine section, and a low pressure turbine section. The power generator can comprise a power turbine, which is disposed aft of a low pressure turbine section, a power turbine exhaust section, an output shaft and an exhaust duct. Rotation of the power turbine drives an output shaft, which may be coupled to an electrical generator that is also part of the power generator. The power turbine may, for example, also drive a pump or gearbox. Gas generated by the gas generator passes through the power turbine and leaves the gas turbine engine 10 via the exhaust duct.

As is known in the art of gas turbine engines, incoming ambient air becomes pressurized within the low and high pressure compressor sections. Fuel mixes with the pressurized air in the combustor section, where it is burned. Once burned, combustion gases expand through the high and low pressure turbine sections and through the power turbine, thereby causing rotation of the output shaft. From the power turbine, the combustion gases flow through the power turbine exhaust section and out the exhaust duct. High and low pressure turbine sections drive high and low pressure rotor shafts, respectively, within the gas turbine engine 10 that rotate in response to the flow of the combustion gases thereby rotating the attached rotor portions of the high and low pressure compressor sections, respectively, to sustain the combustion process.

As discussed previously, each compressor and turbine section includes a plurality of stages of stator vanes (also known as nozzles or stators) and rotor blades (also known as buckets), each vane and blade including an airfoil. In FIG. 1, these stator vanes and rotor blades have been removed for ease of reference and to facilitate illustration of the assembly 14 and hook fits 16, for example. In general, vanes redirect the trajectory of gases coming off the blades for flow into the next stage. In the compressor, vanes convert kinetic energy of moving gases into pressure, while, in the turbine, vanes accelerate pressurized gases to extract kinetic energy. In the compressor, the rotating blades push gases past the stationary vanes. In the turbine, the rotating blades extract rotational power from flowing gases.

In the compressor, the vanes are held in place along their base platforms by the hook fits 16, and more specifically by the opposing pairs of hook fits (e.g., 16A and 16B) utilized for each stage and corresponding to couple with the base platforms. Movement of gases against and across the vanes can cause some small movement of the vanes and their base platforms relative to the hook fits. Over time, this can wear the hook fits necessitating a repair to achieve desired specifications and tolerances.

It is understood the above provides only a basic understanding and overview of the various sections and the basic operation of an industrial gas turbine engine and that those skilled in the art will understand the complexities of gas turbine engine operation and the Brayton cycle. Although described with reference to an aeroderivative industrial gas turbine engine having a power turbine, the present application is applicable to all types of gas turbine engines, including those with aerospace or aircraft applications, and more generally to repair processes and assemblies for any apparatus having a radius along an inner diameter thereof (e.g., piping). Although the above operation and components are described with reference to high and low pressure spools ("dual spool"), the present disclosure may be used with single spool engines having only a single compressor stage and a single turbine stage. Additionally, while an embodiment of the gas turbine engine 10 has been described having low and high pressure turbine sections with connection to an electrical generator via a power turbine, it will be appreciated that the scope of the disclosure is not so limited, and may apply to other arrangements, such as those connected to an electrical generator via the compressor shaft, for example. A gas turbine system as described herein can include a power turbine, a high pressure turbine, a low pressure turbine, a high pressure compressor, and a low pressure compressor, and any component, system or sub-system of a gas turbine engine, industrial gas turbine or the like including rotating components and stationary components that can included slotted interfaces between components.

The present disclosure is directed towards the repair of the hook fits 16 via machining them to achieve a desired specification and/or tolerance. This assembly 14 can be utilized on either an upper half or a lower half of the compressor casing 12 and can be utilized with the rotor (not shown) still mounted within the compressor casing 12.

Figure 2A:
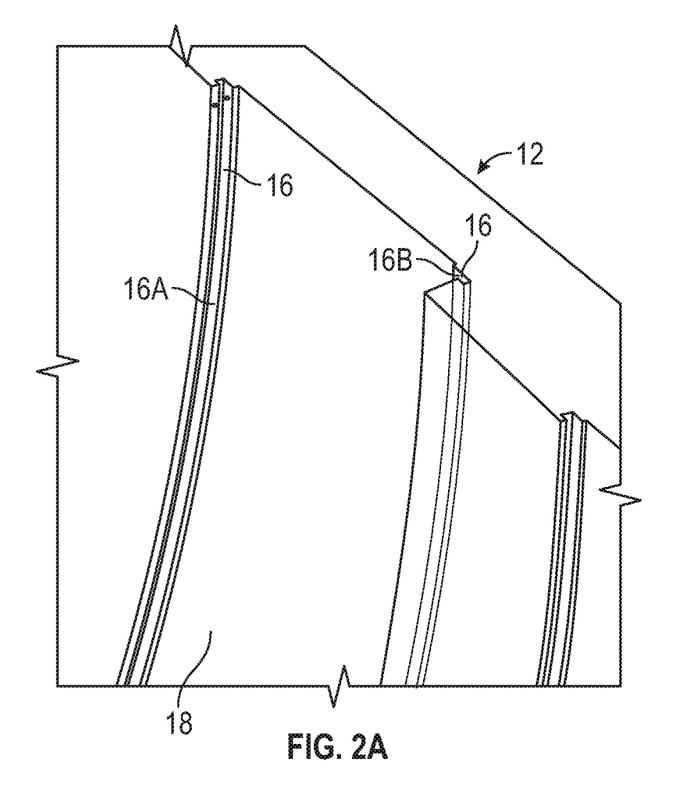
FIGS. 2A and 2B are enlarged views of a portion of the casing of FIG. 1 showing some of the plurality of hook fits in further detail according to an example of the present disclosure.
Figure 2B:
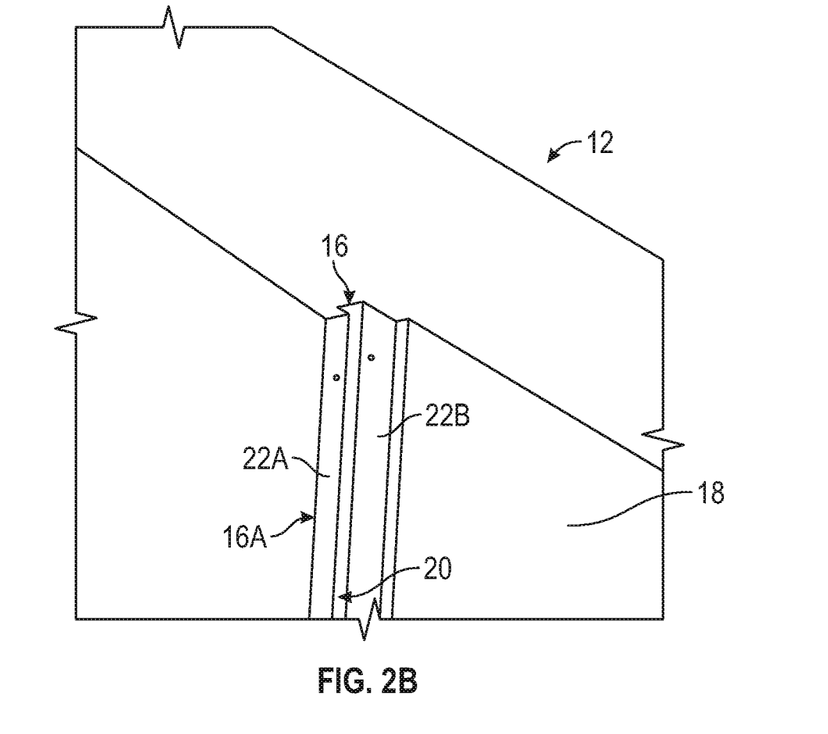

FIGS. 2A and 2B show a portion of the compressor casing 12 in greater detail including the inner surface 18 and the plurality of hook fits 16 (only one of the plurality of hook fits 16A is shown in FIG. 2B).

FIG. 2A shows the arrangement of the plurality of hook fits 16 as opposing pairs 16A and 16B in the axially spaced apart arrangement from one another along the inner surface 18 as previously described. Thus, hook fit 16A faces hook fit 16B in the axial direction. Put another way, hook fit 16A is positioned to face downstream with respect to a flow direction of gases relative to the compressor casing 12 while hook fit 16B is positioned to face upstream with respect to the flow direction. However, it should be noted that the hook fits 16 would not be directly exposed to the flow of the gases due to the stator vanes having platforms mounted in the hook fits 16.

As is best shown in FIG. 2B, the plurality of hook fits 16 can each comprise a circumferential projection type feature extending along the inner surface 18 defining a circumferential groove 20. The hook fits 16 can include at least two surfaces 22A and 22B that are positioned around and can form a part of the groove 20. These at least two surfaces 22A and 22B can be subject to wear, and therefore, can be repaired according to the present methods and utilizing the assemblies disclosed herein. However, it should be noted that the present assemblies and methods can be utilized to repair other portions of the compressor casing 12 such as other parts of the inner surface 18 or other parts of the hook fits 16 not explicitly referenced.

The surface 22A and surface 22B can extend circumferentially along the inner surface 18. In the embodiment of FIG. 2B, the surface 22A is disposed substantially orthogonal to and spaced from the surface 22B. In particular, the surface 22A is disposed radially inward of the surface 22B and is spaced therefrom radially by the groove 20. The surface 22A can be positioned (when machined to desired tolerances and specification using the assemblies and methods herein) to extend substantially in a radial direction and can have only a small to negligible extent in an axial direction as shown in FIG. 2B. In contrast, the surface 22B can be positioned (when machined to desired tolerances and specification using the assemblies and methods herein) to extend substantially in the axial direction and can have a small to negligible extent in the radial direction as shown in FIG. 2B.

Figure 3:
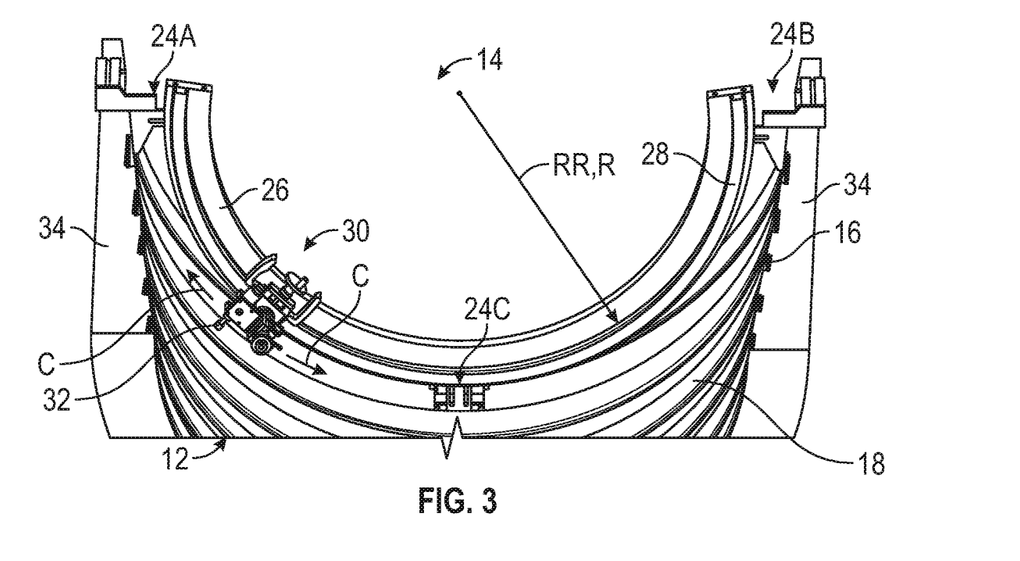
FIG. 3 is a perspective view of a portion of the casing and the assembly of FIG. 1 showing various components of the assembly including mounts, a backplate, track, carrier and machining device according to an example of the present disclosure.

FIG. 3 shows a plan view of the compressor casing 12 and the assembly 14 of FIG. 1. As previously discussed and illustrated, the compressor casing 12 can include the inner surface 18 with the plurality of hook fits 16. The assembly 14 can include a plurality of mounts 24A, 24B and 24C, a backplate 26, a track 28, a carrier 30 and a machining device 32.

The plurality of mounts 24A, 24B and 24C couple to the compressor casing 12 and connect to the backplate 26 to support the backplate 26, track 28, carrier 30 and machining device 32 on the compressor casing 12. The plurality of mounts 24A, 24B and 24C can space the backplate 26 and the track 28 from the inner surface 18 of the compressor casing 12. The backplate 26 connects to the plurality of mounts 24A, 24B and 24C and the track 28. In the embodiment of FIG. 3, the carrier 30 is coupled to the track 28 and is moveable therealong as indicated by arrow C. The machining device 32 is mounted to the carrier 30. The carrier 30 can be configured to adjust at least one of a position and an angle of the machining device 32 relative to the track 28 for machining the inner surface 18 of the compressor casing 12 as is further explained and illustrated subsequently.

The plurality of mounts 24A, 24B and 24C include first end mount 24A and second end mount 24B, which are configured to connect to the backplate 26 on opposing end portions thereof. The first end mount 24A and second end mount 24B are also configured to couple with a horizontal joint 34 of the compressor casing 12. The plurality of mounts 24A, 24B and 24C include intermediate mount 24C that is positioned circumferentially between the first end mount 24A and the second end mount 24B. Although three mounts 24A, 24B and 24C are shown in the embodiment of FIG. 3, further mounts (or fewer mounts) can be utilized as desired.

The backplate 26 can be formed of aluminum or another metal or metal alloy. The backplate 26 can be coupled to the track 28 to provide rigidity for the track 28 to allow the track 28 to maintain a precise shape during the repair process.

The backplate 26 and/or the track 28 are arcuate as shown in the embodiment of FIG. 3. The track 28 can comprise a plurality of abutting arcuate sections or a single arcuate curve according to various embodiments. In FIG. 3, the track 28 extends more than the circumference of the inner surface 18 of the compressor casing 12 (e.g., 190°). Due to the arcuate shape, the track 28 has a radius of curvature RR. When mounted to the compressor casing 12 via the plurality of mounts 24A, 24B and 24C and the backplate 26, the track 28 is configured to be spaced in a substantially concentric arrangement from the inner surface 18 of the compressor casing 12. Thus, the radius of curvature RR of the track 28 can have a substantially similar origin as the radius of curvature R of the inner surface 18 of the compressor casing 12. The track 28 can also be mounted so as to be aligned axial with one of the plurality of hook fits 16 as shown in FIG. 3.

As used herein the term "substantially" as referencing the concentric arrangement of the track 28 relative to the inner surface 18 and in referencing the radii of curvature R and RR means in a three-dimensional space the origin of the radius of curvature RR relative to the origin of radius of curvature R is within 0.005 inches or less of one another.

Figure 4:
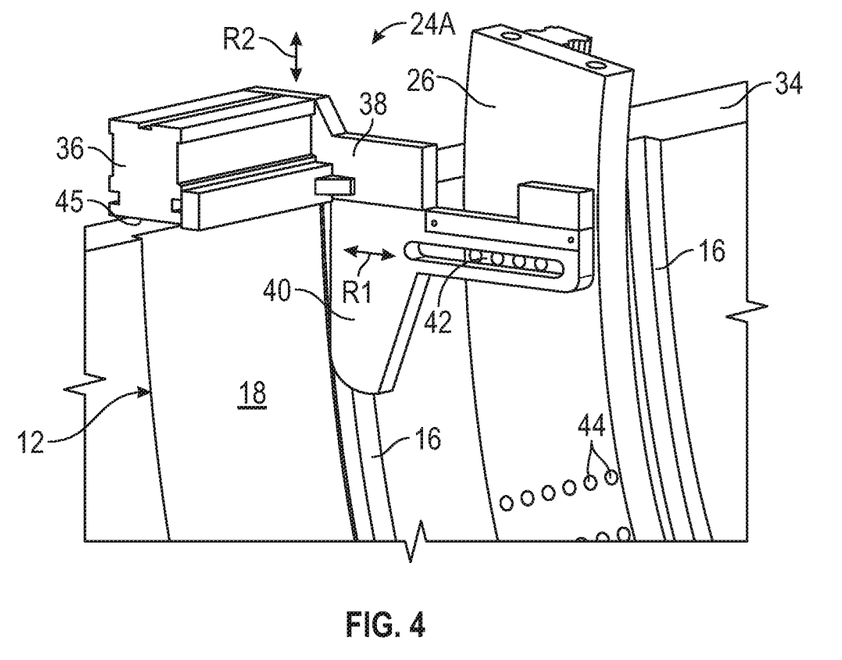
FIG. 4 is a perspective view of one of the mounts of FIG. 3 mounted on a horizontal joint of the casing according to an example of the present disclosure.

FIG. 4 shows an enlarged view of the first end mount 24A of the plurality of mounts 24A, 24B and 24C previously illustrated in FIG. 3 mounted on the horizontal joint 34. FIG. 4 shows a backside portion of the backplate 26 from a reverse axial side of the view of FIG. 3.

Figure 6:
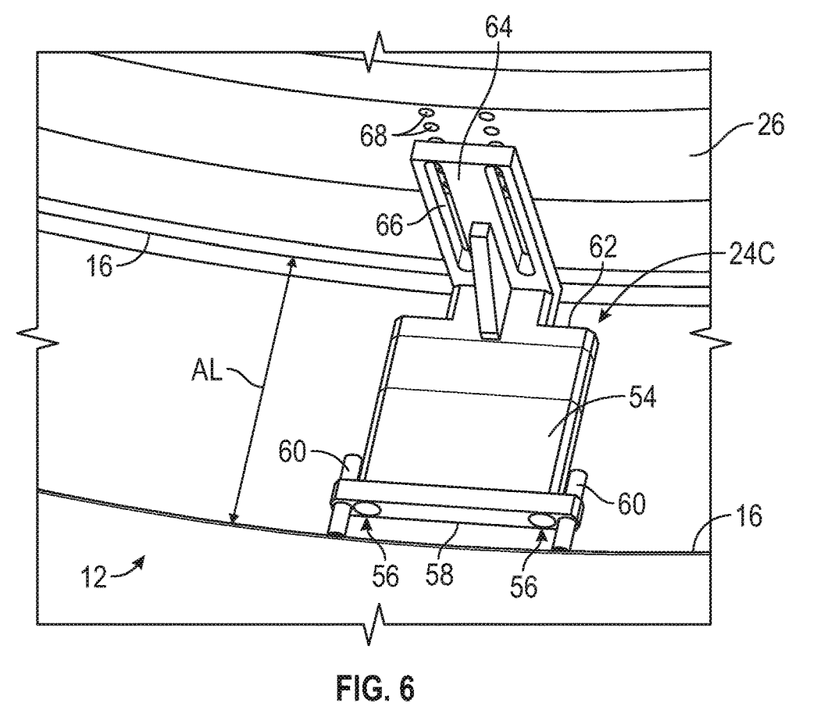
FIG. 6 is a perspective view of a second of the mounts of FIG. 3 mounted between the hook fits of the casing according to an example of the present disclosure.

In the embodiment of FIG. 4, the first end mount 24A includes a base 36, a first bracket 38 and a second bracket 40. The base 36 is configured to couple with the compressor casing 12. The first bracket 38 is connected to the base 36 and is connected to the second bracket 40. The second bracket 40 is configured to connect to the backplate 26 such as by a slot 42. One or more apertures 44 in the backplate 26 can be utilized for mounting with the third mount 24C (FIGS. 1 and 6). One or more fasteners (not shown) can couple the second bracket 40 to the backplate 26 via the slot 42.

The base 36 can include a substantially flat surface 45 configured to rest on the substantially flat horizontal joint 34. In one embodiment, the base 36 comprises a magnetic mount configured to be attached to ferrous metal that comprises the compressor casing 12 at a desired axial location (e.g., an axial location that allows the track 28 (of FIGS. 3 and 5) to be positioned substantially parallel with the plurality of hook fits 16). According to other embodiments, the base 36 can connect to the compressor casing 12 via other mechanical features such as fasteners, clamps or the like.

According to one embodiment, the first bracket 38 and/or the second bracket 40 can be position adjustable relative to the base 36 in an up-and-down manner. This can allow for up-and-down adjustment of the position of the track 28 relative to the inner surface 18 of the compressor casing 12, for example as shown by arrow R2. This adjustment can be done to achieve the substantially concentric arrangement of the track 28 (FIGS. 3 and 4) relative to the inner surface 18 as described previously. Additionally, the base 36, the first bracket 38, the second bracket 40 can be configured to be moveable linearly relative to the track 28 via the slot 42 in a radial manner as indicated by arrow R1. Again, this radial adjustment of the first end mount 24A can adjust the track 28 position can be done to achieve the substantially concentric arrangement of the track 28 (FIGS. 3 and 4) relative to the inner surface 18 as described previously.

Figure 5:
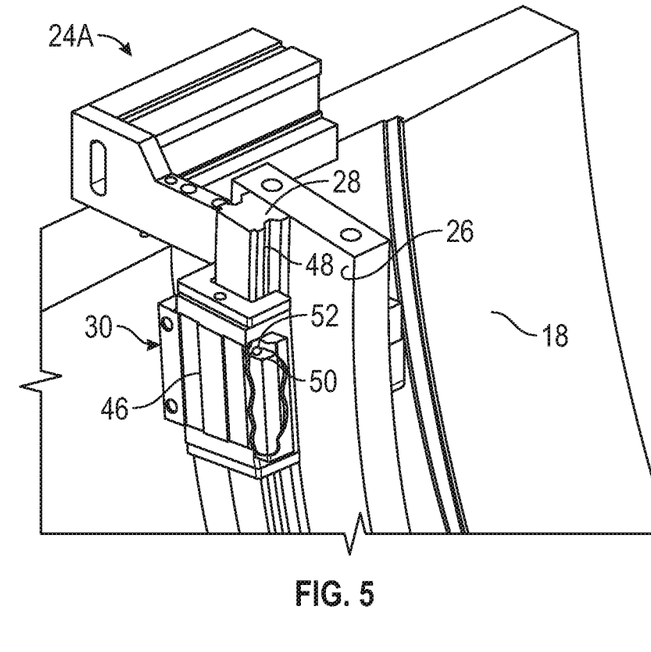
FIG. 5 is a perspective view of a portion of the track and a portion of the carrier of FIG. 3. Showing the track configured as a first bearing race and the carrier as a second bearing race, a breakaway of the carrier shows ball bearings that ride in the first bearing race and the second bearing race to facilitate movement of the carrier according to an example of the present disclosure.

FIG. 5 shows the first end mount 24A of the plurality of mounts 24A, 24B and 24C mounted on the horizontal joint 34 from a second perspective such that a front side of the backplate 26 and the track 28 are shown. Additionally, a portion of the carrier 30 comprising a base mount 46 is shown in FIG. 5.

In the embodiment of FIG. 5, the track 28 is constructed of a metal or metal alloy such as steel. The track 28 defines a first bearing race 48. A break away of the base mount 46 shows that the carrier 30 (in particular the base mount 46) defines a second bearing race 50. Ball bearings 52 are disposed between the first bearing race 48 and the second bearing race 50. Such arrangement allows the carrier 30 to be moveable relative to the track 28 on the ball bearings 52, which ride in the first bearing race 48 and the second bearing race 50. According to the embodiment shown, the track 28 and the base mount 46 can be manufactured by THK America, Inc. of Schaumburg, Ill., for example.

FIG. 6 shows the intermediate mount 24C of the plurality of mounts 24A, 24B and 24C mounted within the inner surface 18 of the compressor casing 12. In the embodiment of FIG. 6, the intermediate mount 24C comprises a foot 54 that is configured to wedge between two axially spaced hook fits 16 (e.g. by contact with surfaces 22A or groove 20 of FIG. 2B, for example) of the compressor casing 12. In particular, the foot 54 includes one or more threaded apertures 56 positioned on a first axial side 58 thereof. The one or more threaded apertures 56 can be used to add additional sections of the foot 54 and the first axial side 58 are configured to interface with one of the hook fits 16. Additionally, a fastener 60 such as a thumb screw can be received in the foot 54. By threading the fastener 60 relative to the foot 54, an axial length AL of the foot 54 and fastener 60 (as measured from an axial tip of the fastener 60 to a second axial side 62 of the foot 54) is adjusted. Thus, the fastener 60 can be positioned as desired via threading to extend further outward or inward of the one or more threaded apertures 56 to contact one of the hook fits 16. The axial length of foot 54 can be adjusted until both the fastener 60 and the second axial side 62 are in contact with respective ones of the hoot fits 16. Although not shown in the embodiment of FIG. 6, the second axial side 62 of the foot 54 proximate a bracket 64 can include an arrangement similar to the first axial side 58. Thus, the second axial side 62 can include one or more apertures and fasteners that can function to contact one of the hook fits 16 as previously described.

The bracket 64 can extend substantially orthogonal to the foot 54 and include one or more mounting features 66 (e.g., slots) configured to be aligned with corresponding apertures 68 on the backplate 26. Fasteners (not shown) connect the bracket 64 to the backplate 26 via the one or more mounting features 66.

Figure 7:
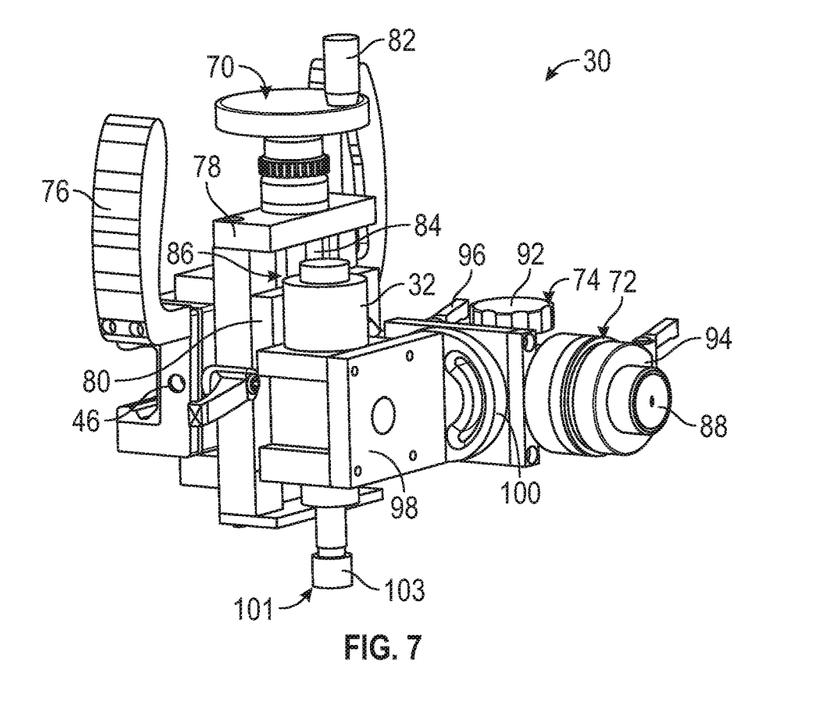
FIG. 7 is a first perspective view of the carrier and the machining apparatus according to an example of the present disclosure.
Figure 8:
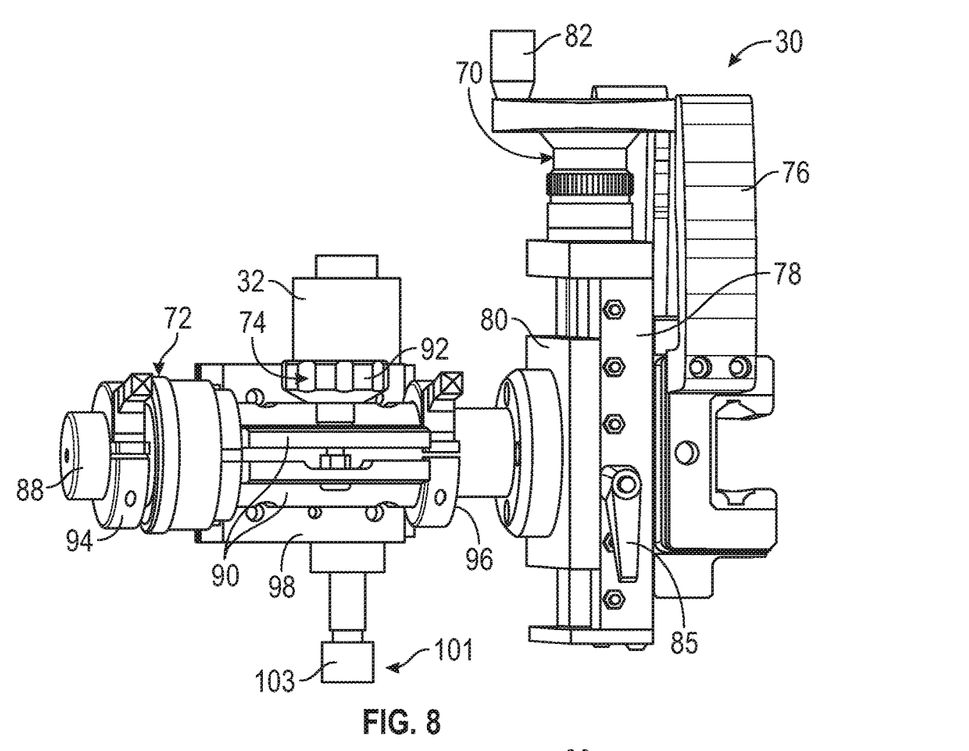
FIG. 8 is a second perspective view of the carrier and the machining apparatus according to an example of the present disclosure.

FIGS. 7 and 8 show the carrier 30 and machining device 32 from different perspectives. In addition to the base mount 46 discussed previously, the carrier 30 includes a radial adjustment mechanism 70, an axial adjustment mechanism 72, an angular adjustment mechanism 74 and handles 76.

As shown in the embodiment of FIGS. 7 and 8, the radial adjustment mechanism 70 is connected to the base mount 46. The handles 76 are connected to the base mount 46 and are positioned to either side of the radial adjustment mechanism 70. The axial adjustment mechanism 72 can be connected to the radial adjustment mechanism 70 and is connected to the angular adjustment mechanism 74. The machining device 32 is connected to the angular adjustment mechanism 74.

The radial adjustment mechanism 70 comprises a table assembly such as one manufactured by Giroud Mecanique de precision SA of Switzerland. The radial adjustment mechanism 70 can include a base 78, a feed table 80, a driver 82, a shaft 84 (FIG. 7) and lock lever 85 (FIG. 8). The base 78 couples with the base mount 46. The base 78 can include a track 86 (FIG. 7) therealong. The track 86 can be received in a mating feature of the feed table 80 to couple the feed table 80 to the base 78. The feed table 80 is moveable relative to the base 78 via the track 86 connection. The feed table 80 is coupled to the shaft 84 by a threaded connection. In turn, the shaft 84 is coupled to the driver 82. The lock lever 85 can be selectively actuated to contact the base mount 46 to lock a radial position of the machining device 32 when a desired radial position is achieved.

When the driver 82 is turned, this turns the shaft 84, which translates the feed table 80. The feed table 80 translates due to being captured in the track 86. In this manner, the radial adjustment mechanism 70 adjusts a position of the machining device 32 in a radial direction toward or away from the inner surface 18 (FIG. 3) of the compressor casing 12 (FIG. 3).

The axial adjustment mechanism 72 includes a shaft 88, a clamp 90, knob 92, a first collar 94 and a second collar 96. The shaft 88 connects to the feed table 80 and extends therefrom in a cantilever configuration. The clamp 90 encloses a portion of the shaft 88 and is connected to the knob 92 via a fastener. The first collar 94 and the second collar 96 are disposed on either side of the clamp 90. The clamp 90 can couple to the machining device 32 and can be part of the angular adjustment mechanism 74.

The shaft 88 can be manufactured by Newport Corporation of Irvine, Calif. The shaft 88 can be configured with anti-nodal weights inside to help dissipate vibrations that travel through the shaft 88 to the feed table 80. These anti-nodal weights are intended to help reduce vibrations created by the machining device 32 when operable.

In the embodiment of FIGS. 7 and 8, the clamp 90 and knob 92 allow for axial position adjustment of the machining device 32 relative to the inner surface 18 (FIG. 3) of the compressor casing 12 (FIG. 3) in concert with the first collar 94 and the second collar 96 to achieve a desired axial position for the machining device 32. More particularly, the first collar 94 and the second collar 96 are each configured to be loosened to be slidable along a length of the shaft 88 to facilitate adjustment of the position of the machining device 32 in the axial direction. This can be accomplished in concert with the clamp 90, which can be loosened via the knob 92 to be slidable with the first collar 94 and the second collar 96. Loosening of the first collar 94, the second collar 96 and the clamp 90 can facilitate rapid but sometimes imprecise adjustment of the machining device 32 in the axial direction. A further, more precise adjustment of the machining device 32 in the axial direction can be utilized in some cases. This can be done using at least one of the two collars 94 and 96. In particular, the first collar 94 can be tightened in place and can have an external (male) threaded ring that extends into and mates with a matching internal thread inside of the axial adjustment mechanism 72. Rotation of the axial adjustment mechanism 72 can move the clamp 90 via the threads to adjust the position of the machining device 32 in the axial direction. A bearing can be disposed between axial adjustment mechanism 72 and the clamp 90 such that the axial adjustment mechanism 72 can be rotated to change axial position of the clamp 90, such that the clamp 90 does not rotate but still maintains attachment with axial adjustment mechanism 72. Once the desired axial position is achieved the clamp 90 can be locked onto the shaft 88 via the knob 92. The first and second collars 94 and 96 can be tightened as desired as well.

The angular adjustment mechanism 74 can include a base 98 and a mount 100. The mount 100 can be integral to the grinder 101 and can be manufactured by Dotco (a division of APEX Tool Group, LLC of Sparks, Md. In the embodiment of FIGS. 7 and 8, the clamp 90 and knob 92 allow for angular position adjustment of the machining device 32 relative to the inner surface 18 (FIG. 3) of the compressor casing 12 (FIG. 3) by actuating the knob 92 to loosen the clamp 90 and by rotating the clamp 90 (from which the remainder of the angular adjustment mechanism 74 is attached) relative to the shaft 88.

The angular adjustment mechanism 74 can be rotated in relation to clamp 90. The slotted mounting holes in the base of 74 (where the base 74 mounts to the claim 90) can show the angular freedom of the base 74 in relation to the clamp 90, and thus, this is how the machining device 32 can be rotated relative to the carrier 30 and track 28.

FIG. 8 shows the machining device 32 comprises a grinder 101 and a bit 103 of the grinder is configured to be changed out to correspond with the angle of the grinder 101 relative to the compressor casing. A conical bit or a cylindrical bit can be used, for example as desired. Changing to the bit 103 can occur sequent to machining (e.g., grinding) of the inner surface of the compressor casing along a second path so the bit 103 is configured to correspond with the angle used for the machining device 32.

Figure 9:
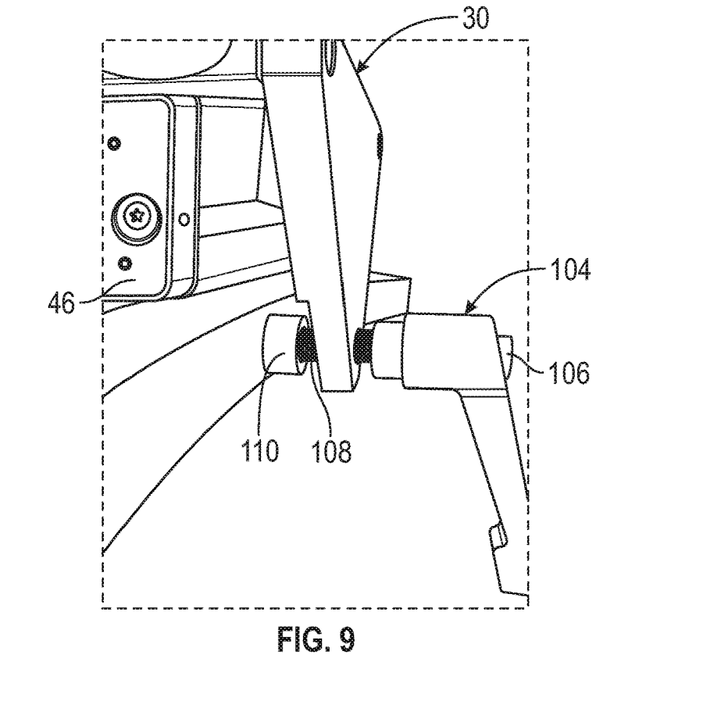
FIG. 9 is a perspective view of a lower portion of the carrier showing a brake according to an example of the present disclosure.

FIG. 9 shows a brake assembly 104 coupled to the base mount 46. The brake assembly 104 includes a handle 106, threaded shaft 108 and member 110. The handle 106 can be rotated to turn the shaft 108 and bring the member 110 in contact with the backplate 26. This can be used to fix the position of the carrier 30 along a length of the track (not shown).

Figure 10:
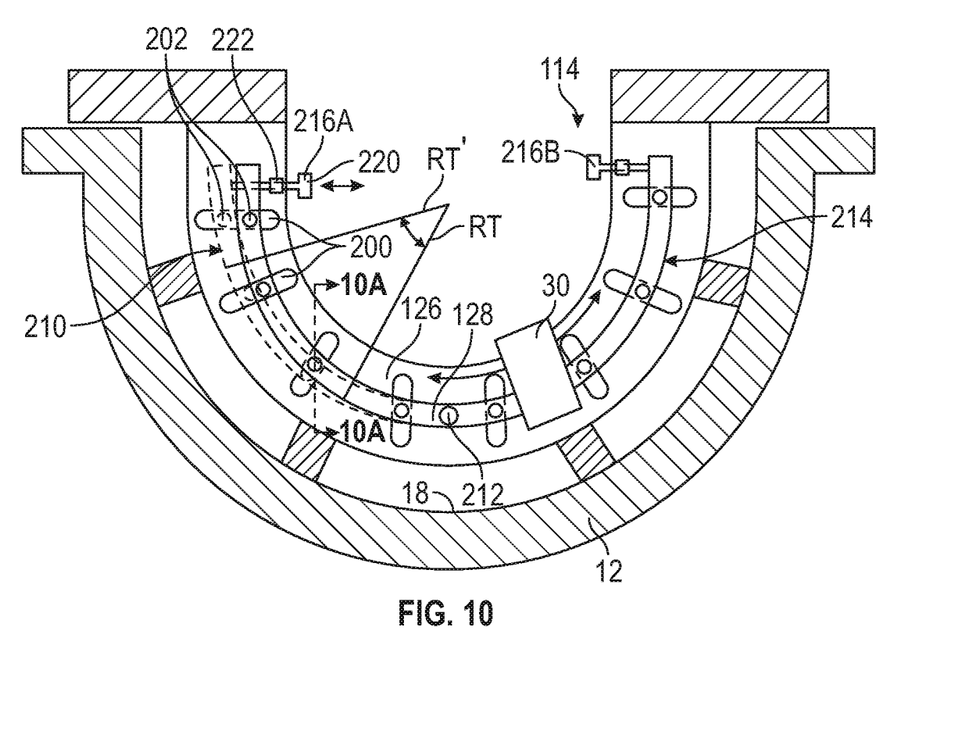
FIG. 10 is a cross-sectional view of a compressor casing and another assembly including a flexible track section (shown in dashed in a flexed state and in solid in an unflexed state) configured to repair the hook fits mounted in the casing according to an example of the present disclosure.
Figure 10A:
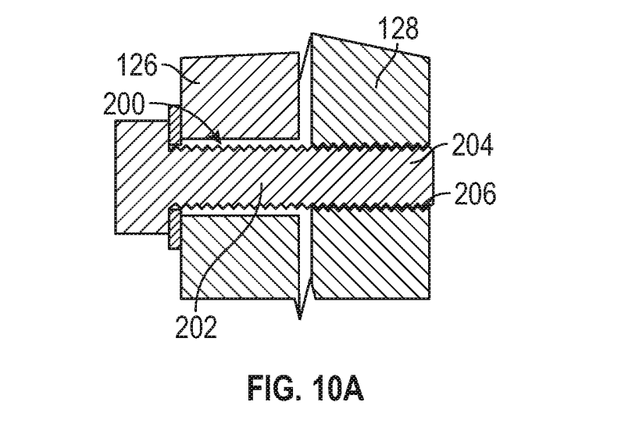
FIG. 10A is a cross-sectional view of a backplate and a track of FIG. 10 along lines A-A of FIG. 10.

FIGS. 10 and 10A show another embodiment of an assembly 114 that includes a backplate 126 and a track 128. The embodiment of FIGS. 10 and 10A differs from prior embodiments in that the track 128 is moveably connected to the backplate 126 and the inner surface 18 of the compressor casing 12 as shown in FIG. 10.

The assembly 114 is mounted to the compressor casing 12 on the track 128 as shown in FIG. 10. As shown in FIG. 10, the assembly 114 can include the plurality of mounts (additional mounts shown as compared to assembly 14), the carrier 30 and the machining device as previously discussed in reference to FIGS. 3-9.

The backplate 126 is arcuate and configured to mount to the compressor casing 12 via the plurality of mounts so as to interface with the inner surface 18. The backplate 126 differs from the backplate 26 (FIG. 3) in that the backplate 126 includes slots 200. These slots 200 can have a major dimension that extends substantially (within a few degrees) radially with respect to a radius of curvature of the backplate 126. As shown in both FIGS. 10 and 10A, each of the slots 200 are configured to receive a bolt 202 or another type of fastener therein to allow for sliding movement of the bolt 202 relative to the backplate 126. As shown in FIG. 10A, the bolt 202 includes a threaded portion 204 configured to couple with a mating thread 206 of the track 128. Such arrangement fixes the bolt 202 to the track 128.

The track 128 can have an arcuate shape with a first radius RT in an unflexed state and a second radius RT' in a flexed state. The second radius RT' can be an oval or elliptical radius in some cases. The second radius RT' can be an eccentric radius relative to the radius of the casing. FIG. 10 shows the track 128 in both the unflexed state and the flexed state (with a first section 210 shown in phantom). In the flexed state, the first section 210 of the track 128 moves via the bolts 202 a distance along the slots 200 from the unflexed state. Such movement is exaggerated in FIG. 10 for ease of reference and can be relatively small amounting to about 0.03 inch or less, for example. The amount of flex of the track 128 in the flexed state relative to the unflexed state can be a relative measurement between the two states. This movement can shift a radius of the first section 210 of the track 128 from the first radius RT to the second radius RT' to substantially correspond with a radius of the inner surface 18 of the compressor casing 12.

A first end of the first section 210 can be fixed to the backplate 126 via a fastener 212 as shown in FIG. 10, while a second end of the first section 210 (adjacent the joint line of the compressor casing 12) can be free to move relative to the backplate 126 as described above. A second section 214 of the track 128 can also be moveable in the same manner as the first section 210.

Movement of the first section 210 and/or second section 214 is facilitated by one or more actuation mechanisms 216A and 216B, for example. The actuation mechanisms 216A and 216B can be disposed adjacent the second end of the first section 210 and/or second section 214. The actuation mechanisms 216A and 216B comprise a thumb screw 220 and threaded block 222 according to the embodiment of FIG. 10. The thumb screw 220 can be tightened to contact the track 128 and cause flexing movement of the track 128 to the flexed state of FIG. 10. The thumb screw can be turned to be retracted from contact with the track 128 (or from contact that causes flexing of the track 128) to allow the track 128 to return to the unflexed state of FIG. 10.

Figure 11:
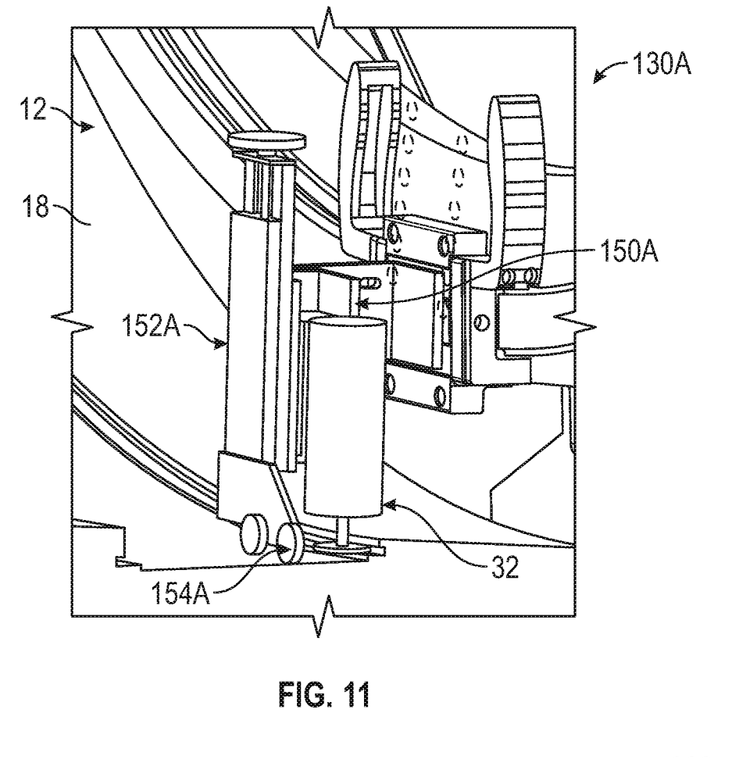
FIG. 11 is a perspective view of another embodiment of a carrier mounted to the track, the carrier having a spring and damper assembly that applies a force to the machining apparatus, the force keeps the machining apparatus radially engaged against the compressor casing according to one example of the present disclosure.

FIG. 11 shows an embodiment where a spring and damper assembly 150A are utilized with a modified carrier 130A similar to the carrier previously described. However, the carrier 130A can be modified with the spring and damper assembly 150A, an adjustable slide 152A, and guide wheels 154A. The spring and damper assembly 150A can be used to provide a radial bias to the machining device 32 in alternatively (or in addition to) the radial adjustment mechanism as previously described. In particular, the spring and damper assembly 150A can be connected to the adjustable slide 152A, which in turn, can be connected to the guide wheels 154A. The guide wheels 154A can be configured to roll along a datum inside the inner surface 18 of the compressor casing 12 for accurate radial positioning of the machining device 32. The adjustable slide 152A can provide fine adjustment of distance between the guide wheels 154A relative to the machining device 32. The spring and damper assembly 150A can bias the radial position of the machining device 32 outward against the inner surface 18 of the compressor casing 12. In this manner, the spring and damper assembly 150A can bias the radial position of the machining device 32 to substantially correspond with a radius of the inner surface 18 of the compressor casing 12 to account for any changes in the radius of curvature of the inner surface 18 should the inner surface 18 be slightly deformed along a circumference thereof.

Figure 12:
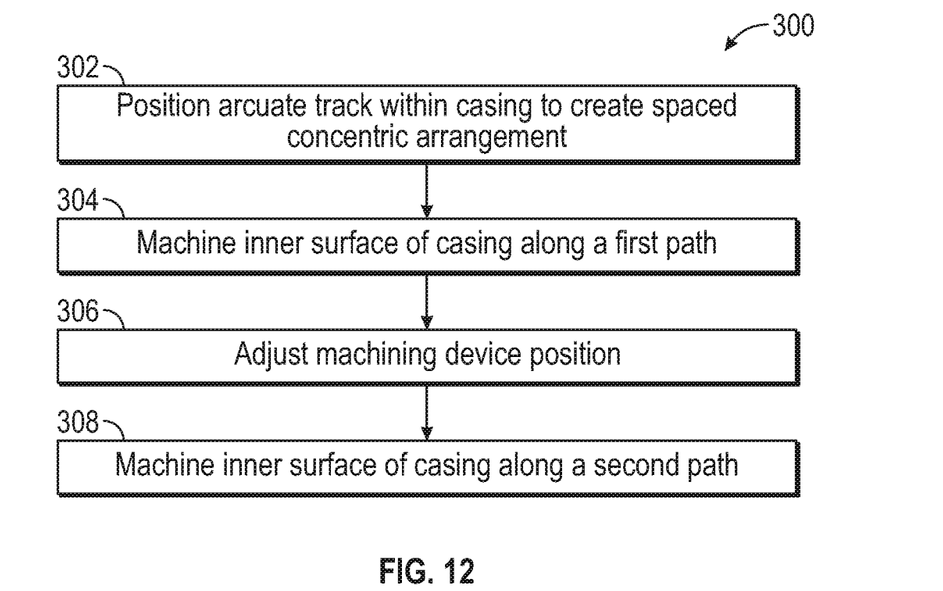
FIG. 12 is a block diagram showing a method for repairing a compressor casing of a gas turbine engine according to one example of the present disclosure.

FIG. 12 shows method 300 for repairing a compressor casing of a gas turbine engine according to one embodiment. An arcuate track is positioned 302 within the casing such that the track is spaced in a substantially concentric arrangement from an inner surface of the casing according to the method 300. The method 300 includes machining 304 the inner surface of the casing along a first path by moving a carrier along the track with a machining device positioned in at least one of a first position and a first angle relative to the track. The machining device is adjusted 306 from the at least one of the first position and the first angle to at least one of a second position and a second angle relative to the track. The inner surface of the casing is machined 308 along a second path by moving the carrier along the track with the machining device positioned in the at least one of the second position and the second angle.

Although not specifically illustrated in the embodiment of FIG. 12, the method 300 can further include changing a bit of the machining device sequent to the machining the inner surface of the casing along the second path so the bit is configured to correspond with the second angle of the machining device. The machining device can be adjusted in step 306 by one or both of adjusting the machining device in a radial direction toward or away from the inner surface of the casing and adjusting the machining device in an axial direction along an axial length of the inner surface of the casing. The machining device can be adjusted in step 306 by adjusting the machining device in an axial direction, which includes adjusting a clamp position between two collars along a length of a shaft and locking the clamp with the shaft once a desired axial position is achieved. The method 300 can include flexing the track to shift a radius of a first section of the track to substantially correspond with a radius of the inner surface of the casing.

While aspects of the disclosure have been described as with reference to compressor casing embodiments, it will be appreciated that the scope of the disclosure is not so limited, and may apply to other features or aspects of the casing that have been subject to wear.

VARIOUS NOTES & EXAMPLES

Example 1 is an assembly for a repair of a compressor casing of a gas turbine engine, the assembly can comprise: an arcuate track configured to be mounted to the casing, wherein when mounted to the casing the track is configured to be spaced in a substantially concentric arrangement from an inner surface of the casing; a carrier coupled to the track and movable therealong; and a machining device mounted to the carrier, the carrier configured to adjust at least an axial position of the machining device relative to the track for machining the inner surface of the casing.

Example 2 is the assembly of Example 1, wherein the carrier can have a radial adjustment mechanism to adjust a radial position of the machining device toward or away from the inner surface of the casing and has an axial adjustment mechanism to adjust the axial position of the machining device along an axial length of the inner surface of the casing.

Example 3 is the assembly of Example 2, wherein the axial adjustment mechanism can include two collars and a clamp, the two collars are configured to be slidable along a length of a shaft extending from the radial adjustment mechanism and can be locked in desired positions along the length of the shaft, wherein the clamp is positioned on the shaft between the two collars and so positioned the clamp is configured to be adjustable along the shaft between the two collars to adjust the axial position of the machining device, and wherein clamp can be locked to couple with the shaft once a desired axial position of the machining device is achieved.

Example 4 is the assembly of any one or any combination of Examples 1-3, wherein the carrier can have an angular adjustment mechanism comprising a rotatable base with indicia thereon to adjust an angle of the machining device relative to the track for machining the casing.

Example 5 is the assembly of Example 4, wherein the machining device can comprise a grinder and a bit of the grinder is configured to be changed out to correspond with the angle of the grinder relative to the casing.

Example 6 is the assembly of any one or any combination of Examples 1-5, and can further comprise an arcuate backplate that is connected to the track, wherein the backplate is supported on the casing by a plurality of mounts including at least a first end mount and a second end mount that are positionally adjustable relative to the inner surface of the casing to adjust a position of the arcuate backplate and track relative to the inner surface of the casing.

Example 7 is the assembly of Example 6, wherein at least one of the first end mount and the second end mount can have a magnetic base that couples to the casing proximate a horizontal joint thereof.

Example 8 is the assembly of Example 6, wherein the plurality of mounts can include at least one foot disposed between the first end mount and the second end mount, wherein the foot is configured to wedge between two axially spaced hook fits of the casing.

Example 9 is the assembly of Example 6, wherein the track can have at least a first section that is moveable relative to the backplate along radially extending slots therein to shift a radius of the first section to substantially correspond with a radius of the inner surface of the casing.

Example 10 is the assembly of Example 9, wherein the track can be flexed by an actuation mechanism disposed adjacent an end of the first section to move the track relative to the backplate and the casing.

Example 11 is the assembly of any one or any combination of Examples 1-10, wherein the track can define a first bearing race and wherein the carrier defines a second bearing race, and wherein the carrier is moveable relative to the track on one or more bearings that ride in the first bearing race and the second bearing race.

Example 12 is the assembly of any one or any combination of Examples 1-11, wherein the carrier can include a spring and damper assembly configured to force the machining device in a radial direction against the inner surface of the casing.

Example 13 is an assembly for a repair of a compressor casing of a gas turbine engine, the assembly can comprise: an arcuate backplate configured to be mounted to the casing by a plurality of mounts; an arcuate track having at least a first section that is moveably connected to the backplate to shift a radius of the first section to substantially correspond with a radius of an inner surface of the casing; a carrier coupled to the track and movable therealong; and a machining device mounted to the carrier, the carrier configured to adjust at least one of a position and an angle of the machining device relative to the track for machining the inner surface of the casing.

Example 14 is the assembly of Example 13, wherein the at least a first section can be moveable relative to the backplate along radially extending slots in the backplate.

Example 15 is the assembly of any one or any combination of Examples 13-14, wherein the track can be flexed by an actuation mechanism disposed adjacent an end of the first section to move the track relative to the backplate and the casing.

Example 16 is a method for repairing a compressor casing of a gas turbine engine, the method can comprise: positioning an arcuate track within the casing; mounting the track within the casing and adjusting a position of the track relative to the casing using a plurality of position adjustable mounts such that the track is spaced in a substantially concentric arrangement from an inner surface of the casing; machining the inner surface of the casing along a first path by moving a carrier along the track with a machining device positioned in at least a first axial position and a first angle relative to the track; adjusting the machining device from the at least the first axial position and the first angle to at least a second axial position and a second angle relative to the track with the track remaining in a same position relative to the casing; and machining the inner surface of the casing along a second path by moving the carrier along the track with the machining device positioned in the at least one of the second axial position and the second angle.

Example 17 is the method of Example 16, and can further comprise changing a bit of the machining device sequent to the machining the inner surface of the casing along the second path so the bit is configured to correspond with the second angle of the machining device.

Example 18 is the method of any one or any combination of Examples 16-18, wherein adjusting includes both of adjusting the machining device in a radial direction toward or away from the inner surface of the casing and adjusting the machining device in an axial direction along an axial length of the inner surface of the casing.

Example 19 is the method of Example 18, wherein adjusting the machining device in the axial direction can include moving a clamp between two collars along a length of a shaft and locking the clamp with the shaft.

Example 20 is the method of any one or any combination of Examples 16-19, an can further comprise flexing the track to shift a radius of a first section of the track to substantially correspond with a radius of the inner surface of the casing.

Example 21 is the method of any one or any combination of Examples 16-20, further comprising radially biasing the machining device in a radial direction into contact with the inner surface of the casing.

Examples provided above can optionally be combined with the subject matter of any one or any combination of Examples 1 through 21, to optionally include any feature or combination of features as desired.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the inventive subject matter can be practiced. These embodiments are may also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the inventive subject matter should be determined with reference to the appended claims, along with the full scope of equivalents to which such claims are entitled.

What is claimed is:

1. A method for repairing a compressor casing of a gas turbine engine, the method comprising:
    positioning an arcuate track within the casing;
    mounting the track within the casing on a plurality of position adjustable mounts;
    adjusting a radial position of the track relative to the casing using the plurality of position adjustable mounts such that the track is spaced radially inward of the casing and in a substantially concentric arrangement from an inner surface of the casing;
    machining the inner surface of the casing along a first path by moving a carrier along the track with a machining device positioned in at least a first axial position and a first angle relative to the track;
    adjusting the machining device from the at least the first axial position and the first angle to at least a second axial position and a second angle relative to the track with the track remaining in a same position relative to the casing; and
    machining the inner surface of the casing along a second path by moving the carrier along the track with the machining device positioned in the second axial position and the second angle.

2. The method of claim 1, wherein adjusting includes both adjusting the machining device in a radial direction toward or away from the inner surface of the casing and adjusting the machining device in an axial direction along an axial length of the inner surface of the casing.

3. The method of claim 2, wherein adjusting the machining device in the axial direction includes moving a clamp between two collars along a length of a shaft and locking the clamp with the shaft.

4. The method of claim 1, further comprising flexing the track to shift a radius of a first section of the track to substantially correspond with a radius of the inner surface of the casing.

5. The method of claim 1, further comprising radially biasing the r device n a radial direction into contact with the inner surface of the casing.

6. The method of claim 1, wherein adjusting the machining device from the at least the first axial position and the first angle to the at least the second axial position and the second angle includes referencing indicia on the machining device.

7. The method of claim 1, wherein adjusting the radial position of the track relative to the casing using the plurality of position adjustable mounts such that, the track is spaced radially inward of the casing and in the substantially concentric arrangement from the inner surface of the casing comprises aligning one or more slots on a bracket of each of the plurality of position adjustable mounts with one or more radially spaced apertures of the track and fastening the track to the bracket using the one or more slots and one or more of the radially spaced apertures.

8. A method for repairing a compressor casing of a gas turbine engine, the method comprising:
    positioning an arcuate track within the casing on a plurality of position adjustable mounts, wherein the plurality of position adjustable mounts include at least a first end mount coupled to a first end portion of the track at or adjacent a first edge of the casing and a second end mount that is coupled to a second end portion of the track at or adjacent a second edge of the casing;
    adjusting a radial position of the track relative to the casing with the plurality of position adjustable mounts such that the track is spaced radially from and in a substantially concentric arrangement from an inner surface of the casing;
    machining the inner surface of the casing along a first path by moving a carrier along the track with a machining device positioned in at least a first position.

9. The method of claim 8, further comprising adjusting the machining device from the at least a first axial position to at least a second axial position relative to the track with the track remaining in a same position relative to the casing, wherein adjusting includes both adjusting the machining device in a radial direction toward or away from the inner surface of the casing and adjusting the machining device in an axial direction along an axial length of the inner surface of the casing.

10. The method of claim 9, wherein adjusting the machining device in the axial direction includes moving a clamp between two collars along a length of a shaft and locking the clamp with the shaft.

11. The method of claim 8, further comprising flexing the track to shift a radius of a first section of the track to substantially correspond with a radius of the inner surface of the casing.

12. The method of claim 8, further comprising radially biasing the machining device in a radial direction into contact with the inner surface of the casing.

13. The method of claim 8, wherein the plurality of position adjustable mounts include an intermediate mount positioned between the first end mount and the second end mount, wherein the intermediate mount wedges between two axially spaced hook fits of the casing to provide for the mounting the track to the casing.

14. A method for repairing a compressor casing of a gas turbine engine, the method comprising:
    positioning an arcuate track within the casing;
    mounting the track to the casing with a plurality of mounts such that the track is spaced in a radially spaced arrangement from an inner surface of the casing and in a substantially concentric arrangement from the inner surface of the casing;
    machining the inner surface of the casing along a first path by moving a carrier along the track with a machining device positioned in at least one of a first axial position and a first angle relative to the track.

15. The method of claim 14, further comprising adjusting the machining device from the at least the first axial position and the first angle to at least one of a second axial position and a second angle relative to the track with the track remaining in a same position relative to the casing, wherein adjusting the machining device from the first axial position to the second axial position includes moving a clamp between two collars along a length of a shaft and locking the clamp with the shaft.

16. The method of claim 14, wherein the mounting the track to the casing includes flexing the track with an adjustment mechanism to shift a radius of a first section of the track to substantially correspond with a radius of the inner surface of the casing.

17. The method of claim 14, further comprising radially biasing the machining device in a radial direction into contact with the inner surface of the casing using a spring and damper assembly mounted to the carrier.

18. The method of claim 16, further comprising an arcuate backplate that is connected to the track, wherein the track has at least a first section that is moveable relative to the backplate along radially extending slots therein to shift a radius of the first section to substantially correspond with a radius of the inner surface of the casing, wherein the track is flexed by an actuation mechanism disposed adjacent an end of the first section to move the track relative to the backplate and the casing.

19. The method of claim 14, wherein the plurality of mounts each comprise a position adjustable mount with a bracket having a slot configured to receive a fastener that connects the position adjustable mount to the track, wherein the track includes a plurality of radially spaced apertures that are each configured to receive the fastener when the slot is aligned with one or more of the radially spaced apertures.

20. The method of claim 14, wherein at least one of the plurality of mounts has a foot that wedges between two axially spaced hook fits of the casing.

21. The method of claim 14, wherein the plurality of mounts include at least a first end mount coupled to a first end portion of the track at or adjacent a first edge of the casing and a second end mount that is coupled to a second end portion of the track at or adjacent a second edge of the casing, and wherein the at least one of the first end mount and the second end mount has a magnetic base that couples to the casing proximate at least one of the first edge and the second edge.

* * * * *